(12) United States Patent
Allard et al.

(10) Patent No.: US 10,343,847 B1
(45) Date of Patent: Jul. 9, 2019

(54) MANURE SCREW PRESS HAVING SCREEN VIBRATION

(71) Applicant: V.Y.F. EXPRESS INC., Drummondville (CA)

(72) Inventors: Jasmin Allard, Saint-Majorique-de-Grantham (CA); Benoit Martin, Saint-Majorique-de-Grantham (CA)

(73) Assignee: V.Y.F. EXPRESS INC., Drummondville, QC (CA)

( * ) Notice: Subject to any disclaimer, the term of this patent is extended or adjusted under 35 U.S.C. 154(b) by 0 days.

(21) Appl. No.: 16/224,426

(22) Filed: Dec. 18, 2018

(51) Int. Cl.
*B65G 33/14* (2006.01)
*B65G 33/26* (2006.01)
*D21C 9/18* (2006.01)
*B30B 9/12* (2006.01)

(52) U.S. Cl.
CPC .......... *B65G 33/14* (2013.01); *B65G 33/265* (2013.01); *B30B 9/127* (2013.01); *D21C 9/18* (2013.01)

(58) Field of Classification Search
CPC .............................. B65G 33/14; B65G 33/265
USPC ........................................ 198/545, 657, 658
See application file for complete search history.

(56) References Cited

U.S. PATENT DOCUMENTS

| | | | | |
|---|---|---|---|---|
| 2,792,030 A | * | 5/1957 | Wahl | B01J 8/002 141/145 |
| 4,709,628 A | * | 12/1987 | Glowacki | B30B 9/18 100/117 |
| 5,009,795 A | * | 4/1991 | Eichler | A23J 3/346 210/744 |
| 5,118,427 A | * | 6/1992 | Eichler | B01D 29/25 210/748.01 |
| 5,327,947 A | | 7/1994 | Mcgregor | |
| 5,381,967 A | | 1/1995 | King | |
| 5,405,049 A | | 4/1995 | Ricciardi | |
| 5,996,484 A | * | 12/1999 | Reddoch | B30B 9/12 100/106 |
| 6,279,471 B1 | * | 8/2001 | Reddoch | B30B 9/12 100/106 |
| 6,553,901 B2 | * | 4/2003 | Reddoch | B30B 9/12 100/106 |
| 6,722,870 B2 | | 4/2004 | Putti | |
| 7,195,084 B2 | * | 3/2007 | Burnett | B65G 53/10 175/206 |

(Continued)

FOREIGN PATENT DOCUMENTS

| CN | 200970496 Y | 11/2007 |
|---|---|---|
| CN | 201016104 Y | 2/2008 |

(Continued)

*Primary Examiner* — Douglas A Hess
(74) *Attorney, Agent, or Firm* — Anglehart et al.

(57) ABSTRACT

A dewatering screw press has a hopper, a discharge outlet, a cylindrical screen flexibly mounted to the hopper and rigidly connected to the discharge outlet, a screw mounted to rotate beginning in the hopper and ending at the discharge outlet, the screw having an outer surface contacting the cylindrical screen, and at least one vibrator mounted to the cylindrical screen. Dewatering efficiency is improved by vibrations that are strong near the middle of the screen, while reducing or eliminating vibration near the discharge end of the screen where pressure is highest and a breaking of the seal between the screw and the screen due to vibration can reduce dewatering of sludge near the discharge end of the screen.

11 Claims, 5 Drawing Sheets

(56) References Cited

U.S. PATENT DOCUMENTS

| | | | | |
|---|---|---|---|---|
| 8,316,557 B2 * | 11/2012 | Burnett | ................ | F26B 7/00 |
| | | | | 175/207 |
| 8,556,129 B1 * | 10/2013 | Hirsch | .............. | G01F 13/005 |
| | | | | 222/236 |
| 8,661,972 B2 * | 3/2014 | Czwaluk | ............... | B30B 9/18 |
| | | | | 100/117 |
| 8,695,804 B2 | 4/2014 | Bennington, II et al. | | |
| 9,162,411 B2 * | 10/2015 | Czwaluk | ............... | B30B 9/12 |
| 9,169,077 B2 * | 10/2015 | Fulara | ................ | B65G 65/46 |
| 9,434,551 B2 | 9/2016 | Mellander et al. | | |
| 9,827,571 B2 * | 11/2017 | Lin | ...................... | B29B 9/04 |
| 2009/0301939 A1 | 12/2009 | Sorensen | | |
| 2016/0023132 A1 | 1/2016 | Bechtl | | |

FOREIGN PATENT DOCUMENTS

| | | |
|---|---|---|
| CN | 203899568 U | 10/2014 |
| CN | 205238264 U | 5/2016 |
| CN | 205705407 U | 11/2016 |
| CN | 206799403 U | 12/2017 |
| FR | 2522586 A1 | 9/1983 |
| JP | H02-40243 U | 3/1990 |
| JP | H05-15804 Y2 | 4/1993 |
| JP | H11-207110 A | 8/1999 |
| RU | 2114736 C1 | 7/1998 |
| RU | 2636961 C1 | 11/2017 |
| WO | WO 86/00568 A1 | 1/1986 |

* cited by examiner

MANURE SCREW PRESS HAVING SCREEN VIBRATION

This is the first patent application for this invention.

TECHNICAL FIELD

The present patent application relates to a screw press used in dewatering of sludge, for example manure. The present patent application also relates to the operation of a dairy farm in which dairy cow bedding that is soiled with manure is dried, sterilized and recycled for re-use as cow bedding.

BACKGROUND

Screw presses for dewatering manure and other sludge materials are well known in the art. An example of a dewatering press used in the dairy industry is the press screw separator PSS 3.3-780 GB sold by FAN Separator GmbH of Marktschorgast, Germany and described in German patent DE 42 32 449 B4 granted to FAN Separator GmbH on Jun. 23, 2005. The beneficial impact of dewatering and reusing manure for cow bedding is also well known in the art, see for example the article by Jean Bonhotal et al. of the Cornell Waste Management Institute of Cornell University's College of Agriculture and Life Sciences, Ithaca, N.Y., titled "Dairy Manure Solids Cut Bedding Costs" published in Northeast Dairy Business, 10(4):24-25, 2008, as well as the article titled "Health Impacts and Economics of Using Dried Manure Solids in the Northeast" by M. C. Schwarz et al. presented at the Ninth Annual Fall Dairy Conference, Liverpool, N.Y. on Nov. 12-13, 2008.

A screw press for dewatering drilling mud in the petroleum industry is disclosed in U.S. Pat. No. 5,996,484 in which the screen is vibrated in the embodiment of FIG. 12 using a vibrator 140 with a view to increase dewatering efficiency.

SUMMARY

Applicant has investigated ways to improve dewatering efficiency of a screw press. Applicant has found that vibration of the sludge being fed into the screw press is difficult and relatively ineffective. Applicant has found that vibration of the cylindrical screen of the screw press fails when strong vibrations act near the high-pressure end of the dewatering screen. Applicant hypothesizes that vibration of the screen at the high-pressure discharge end of the screw press allows for water and sludge to slip back between the auger blade and the screen of the screw press. Applicant has found that vibration applied to the screen in manner that provides for vibration action near the low pressure end of the auger while providing for reduced vibration action near the high pressure end of the auger significantly improves dewatering of the screw press over a screw press in which the vibration is not applied or over a screw press in which vibration is applied over the whole of the screen.

Applicant has found that clogging of the screw press can be reduced if the hopper is filled to a level lower than a full height of the screw or auger. Applicant has found that the loss in dewatering performance due to the resulting lower pressure in the screen near the hopper is compensated by the addition of vibration to the screen.

Applicant has also found that the cleanliness of the sludge material, for example farm animal bedding material, can be improved by adding water to the sludge prior to dewatering.

Applicant has also found that the performance and lifespan of a screw press can be improved by providing a replaceable, flexible edge to the screw or auger. According to some embodiments, there is provided a dewatering screw press comprising a hopper, a discharge outlet, a cylindrical screen flexibly mounted to the hopper and rigidly connected to the discharge outlet, a screw mounted to rotate beginning in the hopper and ending at the discharge outlet, the screw having an outer surface contacting the cylindrical screen, and at least one vibrator mounted to the cylindrical screen. In some embodiments, at least a portion near the discharge outlet of the outer surface of the screw has a plastic or rubber edge for making a seal against the cylindrical screen. In some embodiments, the plastic or rubber edge is clamped to the screw so to be replaceable. In some embodiments, the hopper has an inlet and an outlet at a height for filling the hopper to a level lower that a top of the screw. In some embodiments, the vibrator is mounted at a distance from the hopper further than about one quarter of the distance between the hopper to the discharge outlet. In some embodiments, the cylindrical screen comprises a plurality of reinforcing rings. In some embodiments, the cylindrical screen comprises an elastomeric member connected to the hopper. Dewatering efficiency is improved by vibrations that are strong near the middle of the screen, while reducing or eliminating vibration near the discharge end of the screen where pressure is highest and a breaking of the seal between the screw and the screen due to vibration can reduce dewatering of sludge near the discharge end of the screen.

In some embodiments, the discharge outlet comprises a discharge tube and a displaceable discharge cover. In some embodiments, the displaceable discharge cover comprises a conical member. In some embodiments, an air bladder is provided for applying force to the displaceable discharge cover. In some embodiments, an electric motor and a speed reduction gearbox having an output is connected to the screw.

There is also provided a method of producing milk in a dairy farm comprising collecting soiled bedding from the dairy cow stalls, placing soiled bedding in the hopper of the screw press, vibrating the screw press screen near the inlet with the vibration being reduced near the outlet to dewater soiled bedding, collecting the discharge from the screw press, optionally heat treating the discharge from the screw press, returning the dried bedding to the cow stalls to provide comfort for the cows, and milking the dairy cows. The quality of the dewatering benefits from using embodiments of the vibrating screen screw press described herein.

BRIEF DESCRIPTION OF THE DRAWINGS

The invention will be better understood by way of the following detailed description of embodiments of the invention with reference to the appended drawings, in which.

DETAILED DESCRIPTION

Figure 1:
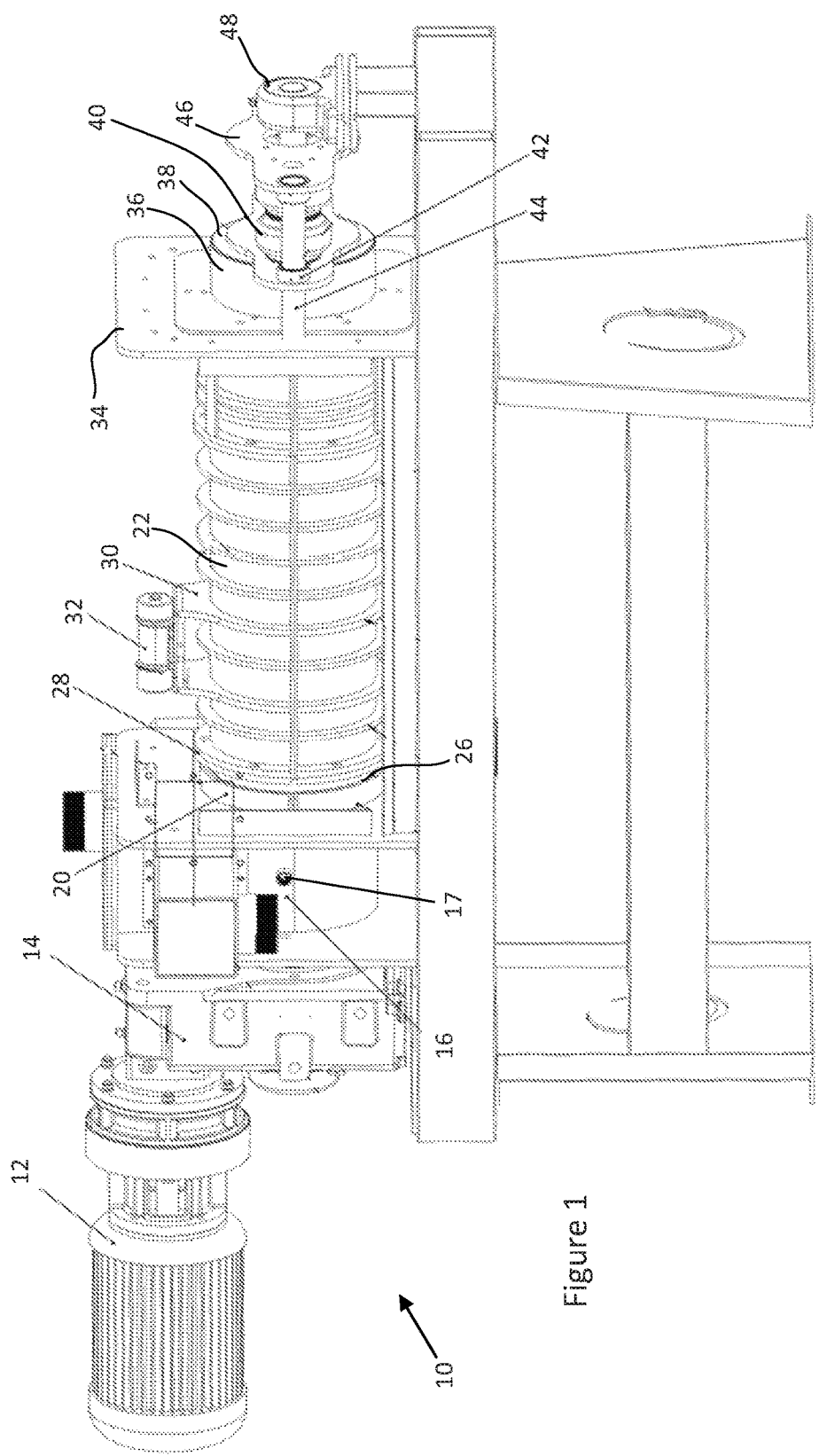
FIG. 1 is a side illustration of a sludge dewatering press with its protective cover removed to show the screen, vibrator and discharge control mechanism.
Figure 2:
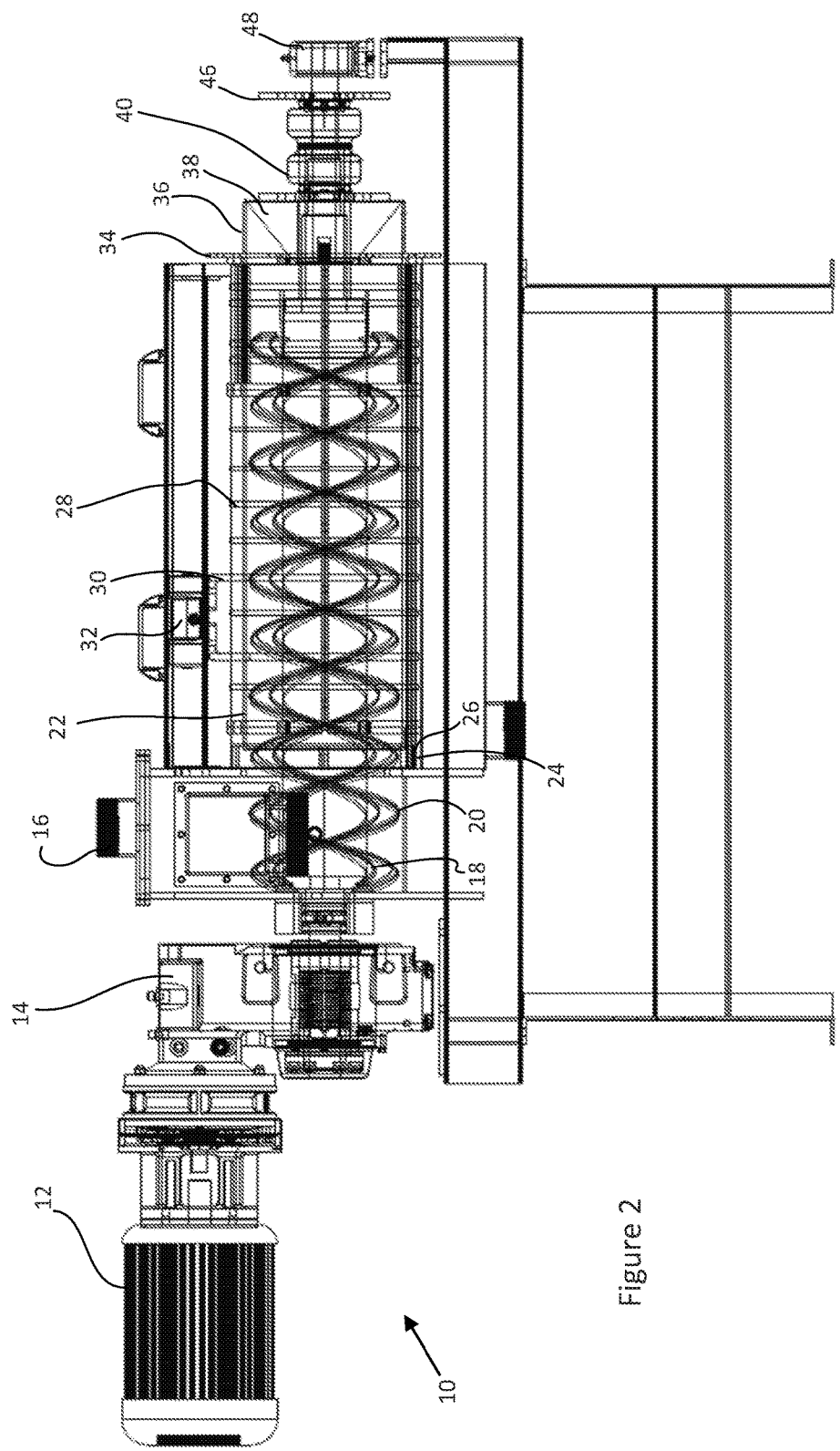
FIG. 2 is wire-frame side view of the screw press of FIG. 1.

FIGS. 1 and 2 show a screw press 10 having a double helix auger blade 18 inside of a screen 22. The screen 22 can be made of wedge wire so as to reduce clogging of the screen 22. The screen 22 can also be made of 304 stainless steel, for example by water jet cutting a sheet of steel that is then hard chrome coated. The auger blade 18 can have a rubber or plastic edge 20, such as a flexible urethane wiper material, that allows the blade 18 to seal better against the screen 22.

Figure 5:
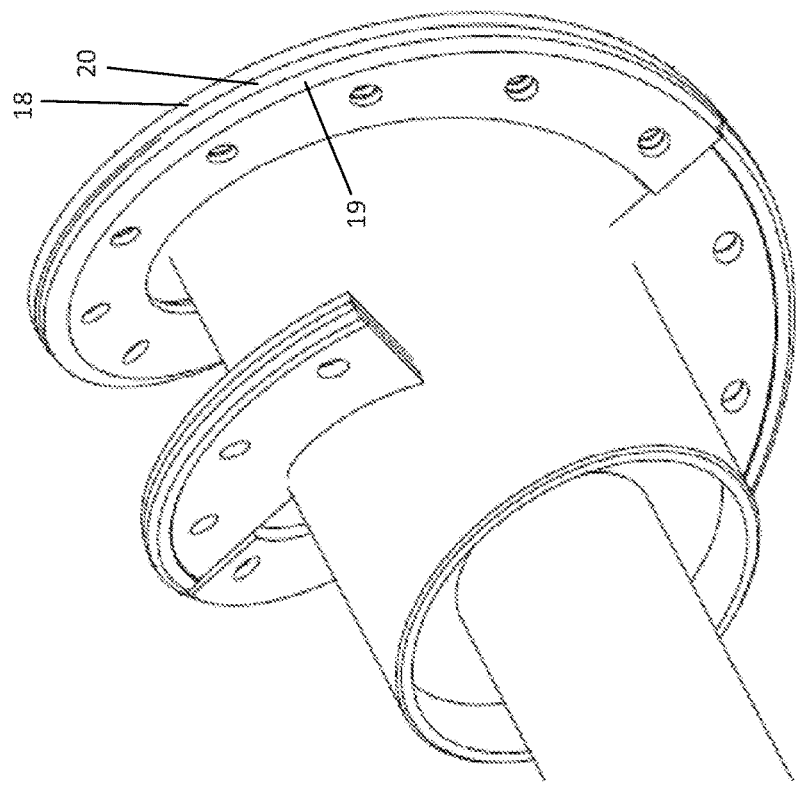
FIG. 5 is a detail of the screw or auger showing how a wear-resistant, flexible member is attached to the blade of the screw using a helical clamping plate.

A detail of the blade 18 is shown in FIG. 5. The edge 20 can be cut out from sheet material as rings and clamped to the blade using clamp members 19 that can be fastened to the blade 18 using bolts, for example using stainless steel bolts that can be fastened through the holes illustrated in the detailed view of FIG. 5. It will be appreciated that the edge material can be attached to the blade 18 in a variety of ways. The edge 20 can extend for example by ⅛ inch beyond the edge of the blade 18. In this way the edge 20 makes frictional and sealing contact with the screen 22. Urethane is a good example of a suitable material because it is flexible and durable. The edge 20 can be replaced as it wears out without having to replace the blade 18.

Returning to FIGS. 1 and 2, a motor 12 can be connected to a gear reduction box 14 to drive the shaft of the blade 18 to compress sludge fed into the hopper 16. The hopper compartment receives one end of the blade 18 where the sludge is received. Applicant has found that vibration of the screen increases dewatering performance sufficiently that pressure in the inlet portion of the screen can be zero while still allowing good flow of liquid across screen 22. Unlike known screw press apparatus, the hopper 16 can be filled to a level that is below the top of the screw 18, for example one or two inches below the top. This would make the pressure at the inlet too low in conventional presses, however, with screen vibration, this is suitable. By having a low pressure in the hopper and into the screen, clogging of the press is greatly reduced. When the sludge has poor flowability or in order to improve the washing of the sludge, fresh water can be introduced to the hopper, for example using a fill port 17.

Figure 4:
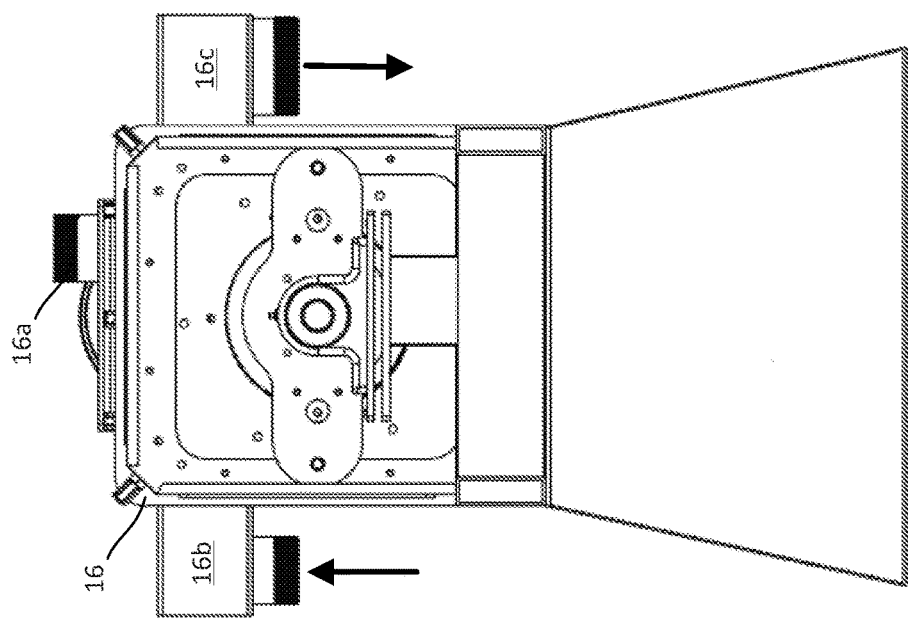
FIG. 4 illustrates a view of the screw press from the discharge end showing the inlet, the outlet and the priming port of the hopper.

In FIG. 4, there is shown how the sludge can be provided to the hopper through an inlet 16b from below. Alternatively, the supply could be from the side. In the case of soiled dairy cow bedding sludge, the sludge can be pumped into inlet 16b from a storage container or pit. The flow of sludge pumped exceeds the capacity of the press 10 and flows through outlet 16c back down to the storage container or pit. It will be appreciated that other arrangements can be used to ensure that the level of sludge in the hopper is low enough to ensure that the starting pressure in the screen 22 is low. Applicant prefers using gravity and the outlet 16c to control the level in the hopper 16. Note that the outlet port 16c can be larger than the inlet port 16b to reduce pressure in the overflow outlet conduit. The hopper can include a priming port 16a for manually filling the hopper during a starting of the press 10 to ensure that press operates with the right quantity of sludge.

Returning to FIGS. 1 and 2, the screen 22 can be connected to the hopper 16 through a flange 24 and a gasket or elastomeric member 26. The member 26 allows for a small amplitude of vibratory motion to take place between the screen 22 and the blade 18, and more specifically between the edge 20 of the blade 18 and the screen 22. The screen 22 can be reinforced by rings 28 along its length as required to support the pressure. Pressure of the sludge material increases from the hopper end to the discharge end where a compression cone 38 fits into a compression tube 36 is mounted to an end plate 34 to control the rate of discharge and thus maintain suitable pressure within the cylindrical screen 22. The compression cone 38 can be mounted on a linear bearing 42 that slides on a shaft 44 connected between the discharge end plate 34 and a back plate 46. The shaft of the screw blade 18 can be rotatably seated in a bearing 48.

While a compression cone arrangement is used in the present embodiment, other types of discharge controls can be used as is known in the art. The desired pressure on the discharge control can be supplied by any suitable means, however, Applicant has found that air bladders 40 as used in the variable suspensions of transport trailers and dump trucks work efficiently.

The air bladders 40 can be provided with pressurized air using a control valve that responds to a torque sensor (not shown) or the current drawn by the motor 12. In this way, when the torque increases to be too high, the discharge can be increased.

Liquid from the sludge is expelled through the screen 22 as a result of the pressure applied by the screw or auger blade 18. While this process is called dewatering, the liquid expelled is typically contaminated and is not only water.

When the screw press of FIGS. 1 and 2 is operated without vibration, liquid is extracted mostly near the discharge end of the screen 22 right before reaching the discharge tube 36. Dewatered sludge is expelled through the tube 36 and cone 38 and can then fall downward through a hole in the base frame for recovery.

A vibrator 32 can be an electric motor vibrator and can be mounted to two extended annular reinforcement rings 30 among the reinforcement rings 28. As will be appreciated, the vibrator can be powered by compressed air or other sources. More than one vibrator 32 can be used if desired. The amplitude and frequency of the vibration can be chosen to best increase the flow of liquid through the screen 22. While more than one vibrator 32 can be provided, vibration sources can act against each other if not correctly positioned or if they are out of phase, so care must be taken when using more than one vibration source 32.

The reinforcement rings 28 can be made of stainless steel and they can be welded to the screen 22. The extended rings 30 can also be welded to the screen 22 to improve the transfer of the vibration motion. When this vibration is added, seepage of liquid from the screen 22 will increase at the inlet end of the screen 22. Because the screen 22 can be mounted to the hopper 16 using an elastomeric gasket 26 placed between a flange of the screen and flange 24 of the hopper 16, the vibration caused by the vibrator 32 is greatest at the inlet where the gasket is and can gradually reduce to zero where the screen 22 can be rigidly connected to the discharge outlet, namely to the compression tube 36. It will be appreciated that the screen 22 can be connected to the discharge plate 34. Tube 36 can be of a length desired at the end of the screen 22.

As shown, the vibrator 32 is not placed too close to the hopper 16 since there is almost no pressure on the sludge at the inlet end of the screen and the addition of the vibration is not useful to increase the flow of liquid. The vibrator 32 can be located where pressure is higher, and the addition of vibration can improve liquid flow across the screen 22. Where along the cylindrical screen 22 pressure is increased depends on the design of the press 10.

In this configuration, the flow of liquid across screen 22 can be about twice to four times the rate near the inlet end of the screen 22 than for the case when the vibration is not applied. When no vibration is applied, most of the liquid is expelled near the discharge end of the screen, and when vibration is applied in the embodiment of FIGS. 1 and 2 liquid can be expelled almost evenly along the screen 22, except for a region very close to the hopper 16 where the pressure is too low.

If the screen is not rigidly connected to the discharge end, but instead is connected using an elastomeric gasket, Applicant has found that while there is an increase in liquid being expelled at the inlet end of the screen, the vibration reduces the flow of liquid across the screen at the discharge end. This reduction in the flow at the discharge end of the screen as a result of a gasket mounting has been observed to be roughly a reduction by about half to one quarter of the flow in comparison to no vibration. Applicant believes that the vibration interferes with the seal between the auger or screw 18 and the screen 22 and causes pressure loss that leads to the reduction in liquid being expelled.

Figure 3A:
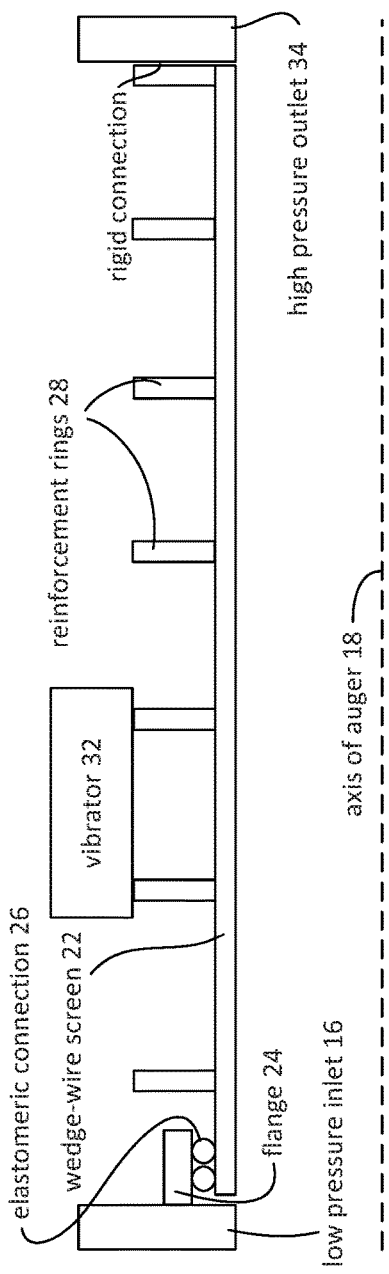
FIG. 3A is a schematic illustration of an upper part of the screen, inlet flange, outlet flange with a vibrator in which the elastomeric joint between the screen and the inlet flange is a cylindrical joint in which vibrations cause compression in the joint.
Figure 3B:
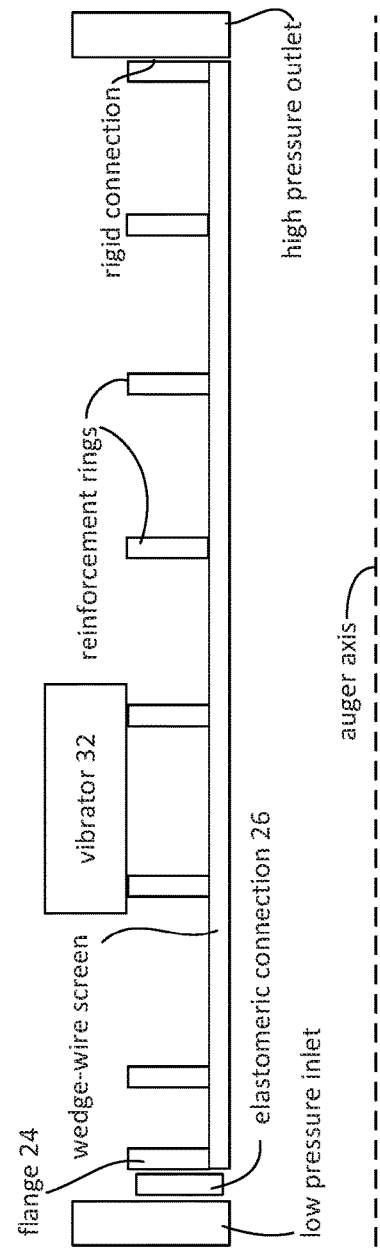
FIG. 3B is a schematic illustration of an upper part of the screen, inlet flange, outlet flange with a vibrator in which the elastomeric joint between the screen and the inlet flange is an annular ring joint in which vibrations cause a shearing action in the joint.

In the embodiment of FIG. 3A, the screen 22 is connected through an elastomeric joint 26 to a cylindrical flange 24 of the hopper 16. The joint 26 can be, for example, a rubber ring, or it can comprise one or more O-rings. In the embodiment of FIG. 3B, the joint 26 is an annular elastomeric member placed between a flange 24 at the end of the screen 22 and the hopper 16. Because the pressure at the inlet end of the screen 22 is low, it will be appreciated that the need to have a pressure resistant seal is low. Therefore, a variety of different ways of connecting the screen 2 to the hopper 16 while allowing for the screen 22 to vibrate can be used other than a full elastomeric seal.

While not illustrated, press 10 can be provided with a suitable cover. A suitable liquid recovery trough or collector can be provided in the frame of the press 10.

Figure 6:
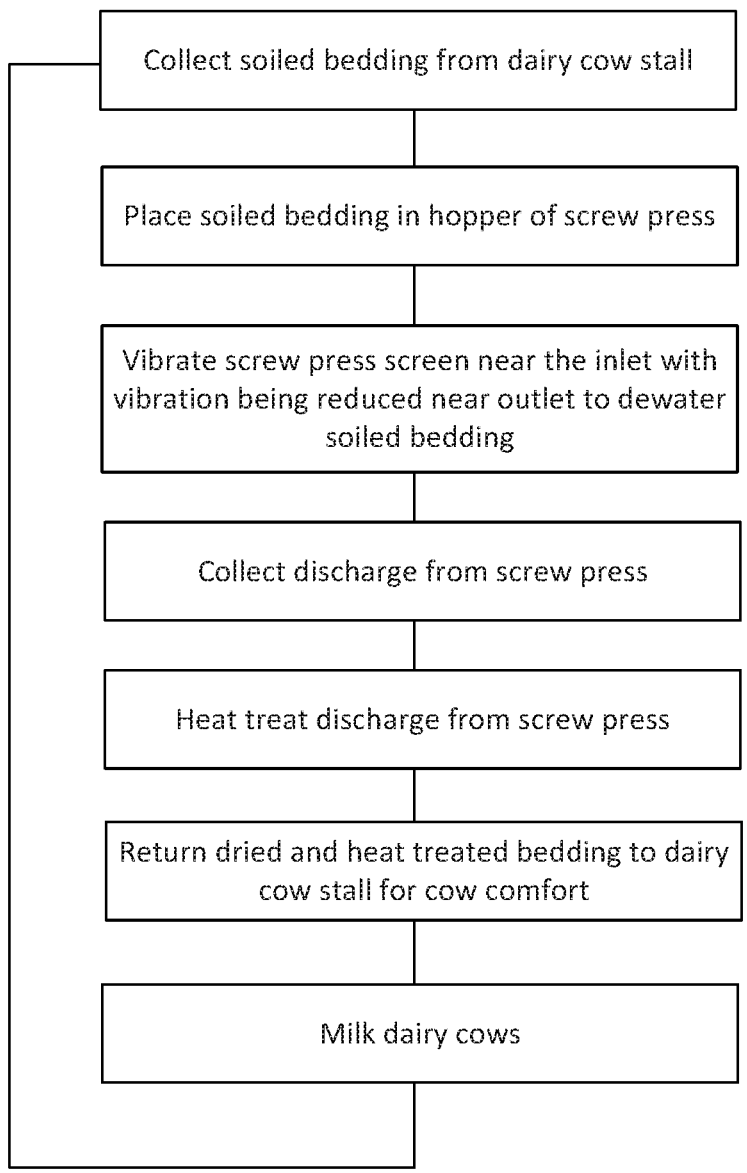
FIG. 6 is a flow diagram of steps involved in an embodiment of dairy operation using the screw press of the embodiment of FIGS. 1 and 2.

As illustrated in FIG. 6, the press 10 having an improved dewatering capability due to the vibration source is useful in a dairy farm. Soiled bedding is collected from the dairy cow stalls. Once a stall is cleaned, it can be replaced with clean bedding material, although in FIG. 4 this is a later step. The soiled bedding is mostly cow manure and is fed into the hopper 16 of the press 10. The operator may observe the dewatering process to ensure that the manure is flowing properly into and out of the press 10. The dewatered manure is discharged from the press 10. Optionally, the dewatered manure can be heat treated. Heat treatment can be used to kill some or all of the pathogens contained in the dewatered sludge. It can also increase the dryness of the sludge. The processed sludge is then recycled as bedding material. The operation of the dairy farm continues including the milking of the cows.

As known in the art, the use of dairy manure solids (DMS) as bedding material is cost effective because it reduces the cost of new bedding material and it reduces the cost of disposing of used bedding material due to the possibility of on-site processing using press 10.

It will also be appreciated that the reduction in moisture content in the dewatered sludge using a screw press as a result of using screen vibration as described herein then leads to a reduction in energy costs and time to use heat treating of the sludge to produce safe and comfortable DMS.

What is claimed is:

1. A dewatering screw press comprising:
   a hopper;
   a discharge outlet;
   a cylindrical screen flexibly mounted to the hopper and rigidly connected to the discharge outlet;
   a screw mounted to rotate beginning in the hopper and ending at the discharge outlet, the screw having an outer surface contacting the cylindrical screen; and
   at least one vibrator mounted to the cylindrical screen.

2. The dewatering screw press as defined in claim 1, wherein at least a portion near the discharge outlet of the outer surface of the screw has a plastic or rubber edge for making a seal against the cylindrical screen.

3. The dewatering screw press as defined in claim 2, wherein said plastic or rubber edge is clamped to said screw to be replaceable.

4. The dewatering screw press as defined in claim 1, wherein the hopper has an inlet and an outlet at a height for filling the hopper to a level lower than a top of the screw.

5. The dewatering screw press as defined in claim 1, wherein the at least one vibrator is mounted at a distance from the hopper further than about one quarter of the distance between the hopper to the discharge outlet.

6. The dewatering screw press as defined in claim 1, wherein the cylindrical screen comprises a plurality of reinforcing rings.

7. The dewatering screw press as defined in claim 1, wherein the cylindrical screen comprises an elastomeric member connected to the hopper.

8. The dewatering screw press as defined in claim 1, wherein the discharge outlet comprises a discharge tube and a displaceable discharge cover.

9. The dewatering screw press as defined in claim 8, wherein the displaceable discharge cover comprises a conical member.

10. The dewatering screw press as defined in claim 8, further comprising an air bladder for applying force to the displaceable discharge cover.

11. The dewatering screw press as defined in claim 1, further comprising an electric motor and a speed reduction gearbox having an output connected to the screw.

* * * * *